US006289357B1

United States Patent
Parker (10) Patent No.: US 6,289,357 B1
(45) Date of Patent: *Sep. 11, 2001

(54) METHOD OF AUTOMATICALLY SYNCHRONIZING MIRRORED DATABASE OBJECTS

(75) Inventor: Christopher F. Parker, Oswego, IL (US)

(73) Assignee: Platinum Technology IP, Inc., Oakbrook Terrace, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,183

(22) Filed: Apr. 24, 1998

(51) Int. Cl.[7] ................................................. G06F 17/30
(52) U.S. Cl. ................. 707/202; 203/204; 203/205; 203/206; 203/201; 203/200
(58) Field of Search ............................... 707/8, 10, 100, 707/200, 201, 202, 203, 204–205, 104, 206; 714/5, 6

(56) References Cited

U.S. PATENT DOCUMENTS

| | | | |
|---|---|---|---|
| 5,170,480 | | 12/1992 | Mohan et al. ........................ 707/201 |
| 5,325,522 | * | 6/1994 | Vaughn ..................................... 707/1 |
| 5,455,947 | | 10/1995 | Suzuki et al. ......................... 707/204 |
| 5,530,855 | | 6/1996 | Satoh et al. .......................... 707/201 |
| 5,548,750 | * | 8/1996 | Larsson et al. ....................... 707/204 |
| 5,596,706 | | 1/1997 | Shimazaki et al. ...................... 714/6 |
| 5,615,329 | * | 3/1997 | Kern et al. ............................... 714/6 |
| 5,615,364 | * | 3/1997 | Marks .................................. 707/202 |
| 5,640,561 | | 6/1997 | Satoh et al. .......................... 707/202 |
| 5,666,530 | | 9/1997 | Clark et al. .......................... 707/201 |
| 5,684,990 | | 11/1997 | Boothby .............................. 707/203 |
| 5,729,735 | | 3/1998 | Meyering ............................... 707/10 |
| 5,903,898 | * | 5/1999 | Cohen et al. ........................ 704/204 |
| 5,907,848 | * | 5/1999 | Zaiken et al. ........................ 707/202 |
| 5,924,096 | * | 7/1999 | Draper et al. .......................... 707/10 |
| 5,974,563 | * | 10/1999 | Beeler, Jr. ............................... 714/5 |
| 6,065,108 | * | 5/2000 | Beier et al. .......................... 707/202 |
| 6,070,174 | * | 5/2000 | Starek et al. ........................ 707/206 |
| 6,178,427 | * | 1/2001 | Parker .................................. 707/202 |

FOREIGN PATENT DOCUMENTS

| | | |
|---|---|---|
| 403043789A | 2/1991 | (JP) . |
| 403256143A | 11/1991 | (JP) . |
| 404352061A | 12/1992 | (JP) . |

* cited by examiner

Primary Examiner—Thomas Black
Assistant Examiner—Diane D. Mizrahi
(74) Attorney, Agent, or Firm—Baker & McKenzie (57) ABSTRACT

A method of automatically synchronizing a database with a backup database. The method automatically detects whether the backup database has fallen out of sync with the primary database which it mirrors. In response, a resynchronization process is automatically initiated in which the starting point for reading a redo log of the primary database is automatically determined and in which the backup database is automatically synchronized with the primary dataset.

21 Claims, 7 Drawing Sheets

METHOD OF AUTOMATICALLY SYNCHRONIZING MIRRORED DATABASE OBJECTS

FIELD OF THE INVENTION

The present invention relates to database management systems, in particular to systems and methods of synchronizing mirrored database objects.

BACKGROUND OF THE INVENTION

Methods and systems are known for creating and maintaining backup copies of a primary database which can be used in place of the primary database should the primary database become unavailable. The backup and primary databases are typically maintained on separate systems, to reduce the possibility that a disruptive event will affect both databases. Changes made to the primary database are also applied to the backup database to keep the backup database up-to-date with the primary database.

Maintaining synchronization between a backup database and a primary database can be problematic, especially where there is a failure of the backup system or a communications failure between the primary and backup systems.

Such problems also exist when mirroring database objects maintained with the DB2 database management system available from International Business Machines Corporation of Armonk, N.Y. Any object maintained by DB2 within a virtual storage access method (VSAM) dataset, including tablespaces, tables and indexes can be mirrored. Updates to a DB2 object are logged by DB2. To mirror the original or source object, the log entries can be applied to the mirror or target object so that it is updated with the same actions which were applied to the source object. However, when an object is being mirrored and updates are performed on the mirror object via the DB2 log, there are certain conditions or operations that can result in an invalid mirror object.

One such condition is a "point-in-time," or "partial," recovery. When such a recovery is performed, the data contained in the source DB2 object is refreshed to some point in time other than current. Reasons this would occur include, but are not limited to a data outage and invalid updates by an application program.

A second such condition occurs with a REORG LOG (NO) operation. This operation reorganizes the rows in an object and may in fact relocate them to another part of the object without logging any of the actions carried out in the reorganization.

A third condition which can invalidate the mirror dataset occurs with a LOAD LOG(NO) operation. This operation loads data into a table, over-writing existing data without logging the changes made. This operation is typically performed by a database administrator (DBA) when a table requires more data or in some cases, it is used as a method of recovery.

The aforementioned operations will cause the physical data in the primary, or "source," dataset to be rearranged in a manner which will not be reflected in the DB2 log. As a result, any newly logged data describing changes to the source object cannot be applied to the backup, or "target," dataset without the risk of compromising the data's integrity.

A conventional approach to re-synchronizing the target dataset with the source dataset requires the user to refresh the data in the target dataset using some mechanism to get the data from the source to the target. This may be performed using a copy utility and either a copy of the source or the actual source dataset. In either case, it is a manual intervention that the user needs to perform. Additionally, the user must also somehow determine a new starting point in the DB2 log from which to begin applying log records. In other words, the user is required to identify a point in which the primary and backup databases were synchronized (or "in sync") with each other and then apply to the backup database redo log entries following that point until the backup database is brought back up-to-date with the primary database. Mirroring cannot restart until all of the log records from the predetermined starting point up to the always changing current logpoint are applied.

Another approach is to make, on the backup system, an entirely new copy of the primary database. During such a creation of a new backup database, the backup database will typically not be available for ongoing updates. Because such a process can be rather time consuming, a wide window of time is thus created in which there is no valid backup database available.

SUMMARY OF THE INVENTION

The present invention provides a method and system for automatically synchronizing a backup database with a primary database. The method of the present invention automatically detects whether a backup database has fallen out of sync with the primary database which the backup database is intended to mirror. In response, a resynchronization process is automatically initiated in which first, the contents of the primary database are written into the backup database. During this update procedure, the starting point for reading a redo log file of the primary database is automatically determined. The redo log file is then read, beginning at the starting point, and the log file entries are applied to the backup database automatically. After that, real time log data from the primary database is automatically applied to the backup database, thereby completing the automatic resynchronization of the databases.

Once synchronization has been established, the method of the present invention continuously monitors the log data of the primary database and applies the logged actions to the backup database, thereby maintaining synchronization. If a condition is detected which could lead to an invalid backup database, the aforementioned resynchronization procedure is automatically executed.

The method and system of the present invention can be applied to software-only mirroring as well as to replication processes.

DETAILED DESCRIPTION OF THE INVENTION

Figure 1A:
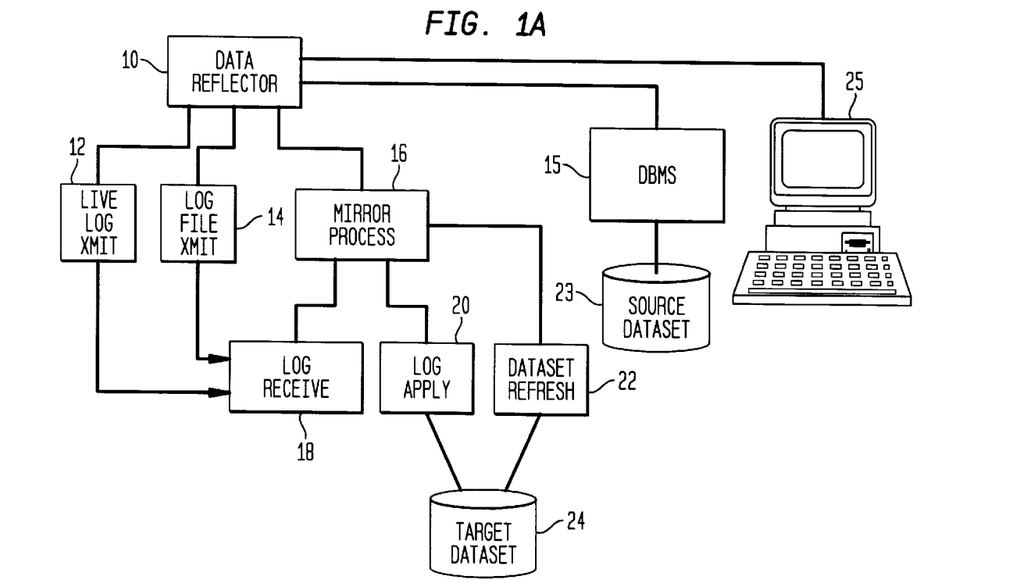
FIGS. 1A and 1B are block diagrams of local and remote mirroring systems, respectively, in accordance with the present invention.

FIG. 1A is a block diagram of a local mirroring system in accordance with the present invention. In the system of FIG. 1A, a database management system (DBMS) 15, such as DB2, maintains a source dataset 23. Actions performed on the source dataset 23 are logged by the DBMS 15. Logged actions are entered into a log file which is typically stored in mass storage (e.g., tape, disk). The DBMS may also maintain a live, or real time log of the most recent logged actions which is typically maintained in faster, volatile memory (e.g. RAM). The logged actions are monitored by a data reflector process 10 which uses the log entries to update a target dataset 24 and to keep it synchronized with the source dataset 23.

The data reflector process 10, which runs on a database computer system, e.g., an MVS system, serves as a transaction processor for mirroring data. The data reflector process 10 and the DBMS 15 typically run on the same hardware platform. The data reflector process 10 interacts with processes 12–22 running on the database computer system. A mirror process 16 manages the mirroring functions in accordance with the present invention by interacting with a log receive process 18, a log application process 20 and a dataset refresh process 22. The target refresh process 22 refreshes the target dataset by copying the contents of the source dataset into the target dataset.

As discussed, updates to the source dataset 23 are logged by the DBMS 15. Log entries written into the log file are sent by a log file transmit process 14 to a log receive process 18. Once the log file has been transmitted by the process 14, real time logged actions in the live log are sent to the log receive process 18 by a live log transmit process 12 as those actions occur.

The mirror process 16 takes the log entries received by the log receive process 18 and provides them to a log application process 20 which applies the logged actions to the target dataset 24. In this manner, the target dataset 24 is updated with the same actions that were applied to the source dataset 23 since the two datasets were last in sync.

A terminal 25 which interfaces to the data reflector process 10 can be used to provide a user interface with the mirroring process. The terminal 25 can be used to request the mirroring of a particular object, to input processing options or to monitor the mirroring process.

Figure 1B:
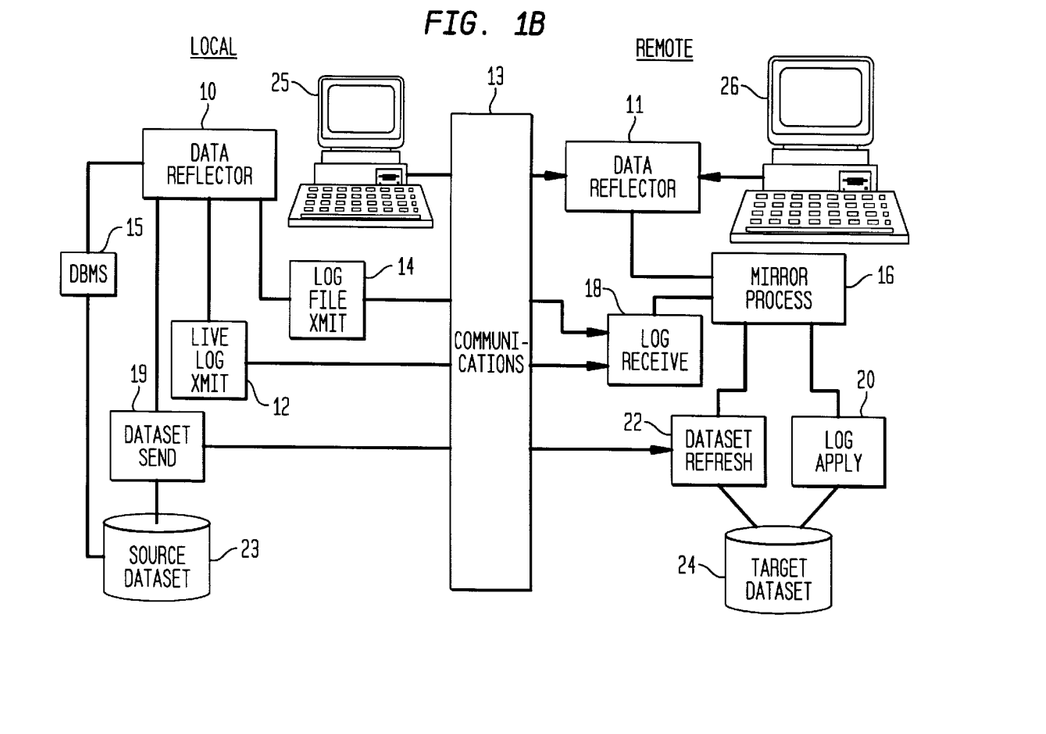

FIG. 1B is a block diagram of a remote mirroring system in accordance with the present invention. The components and functionality of the system of FIG. 1B are similar to those of the local mirroring system of FIG. 1A except that the target and source systems are remotely located and are linked by a communications system 13, such as an intranet, LAN, WAN, etc. In this embodiment, data reflector processes 10 and 11 run on each of the source and target systems, respectively. The log file transmit process 14 and the live log transmit process 12 reside on the source system and operate as in the local mirroring system of FIG. 1A to transmit log data generated by the DBMS 15 to a log receive process 18, which resides on the target system. In addition, the source system includes a dataset send process 19 which transmits the contents of the source dataset 23 to a dataset refresh process 22 on the target system. The dataset refresh process 22 updates the target dataset 24 with the source dataset contents received from the dataset send process 19.

In the embodiment of FIG. 1B, a mirroring process 16, a log receive process 18 and a log apply process 20 reside on the target system and operate in the same manner as in FIG. 1A.

Furthermore, a user terminal 25, typically co-located with the source system, is used to provide user input to the data reflector process 11 in the target system and to allow monitoring of the mirroring process. Another user terminal 26 can also be located at the target system and serves the same purpose as terminal 25.

The method and system of the present invention will now be described in greater detail with reference to FIGS. 2A through 2E. FIGS. 2A–2E are flow charts illustrating an exemplary embodiment of an automatic synchronization process in accordance with the present invention. The method and system of the present invention can be used for local or remote database mirroring. Furthermore, although the exemplary embodiment of FIGS. 2A–2E is adapted to operate with the DB2 DBMS, other embodiments of the present invention for operation with other kinds of DBMSs can also be implemented.

Figure 2A:
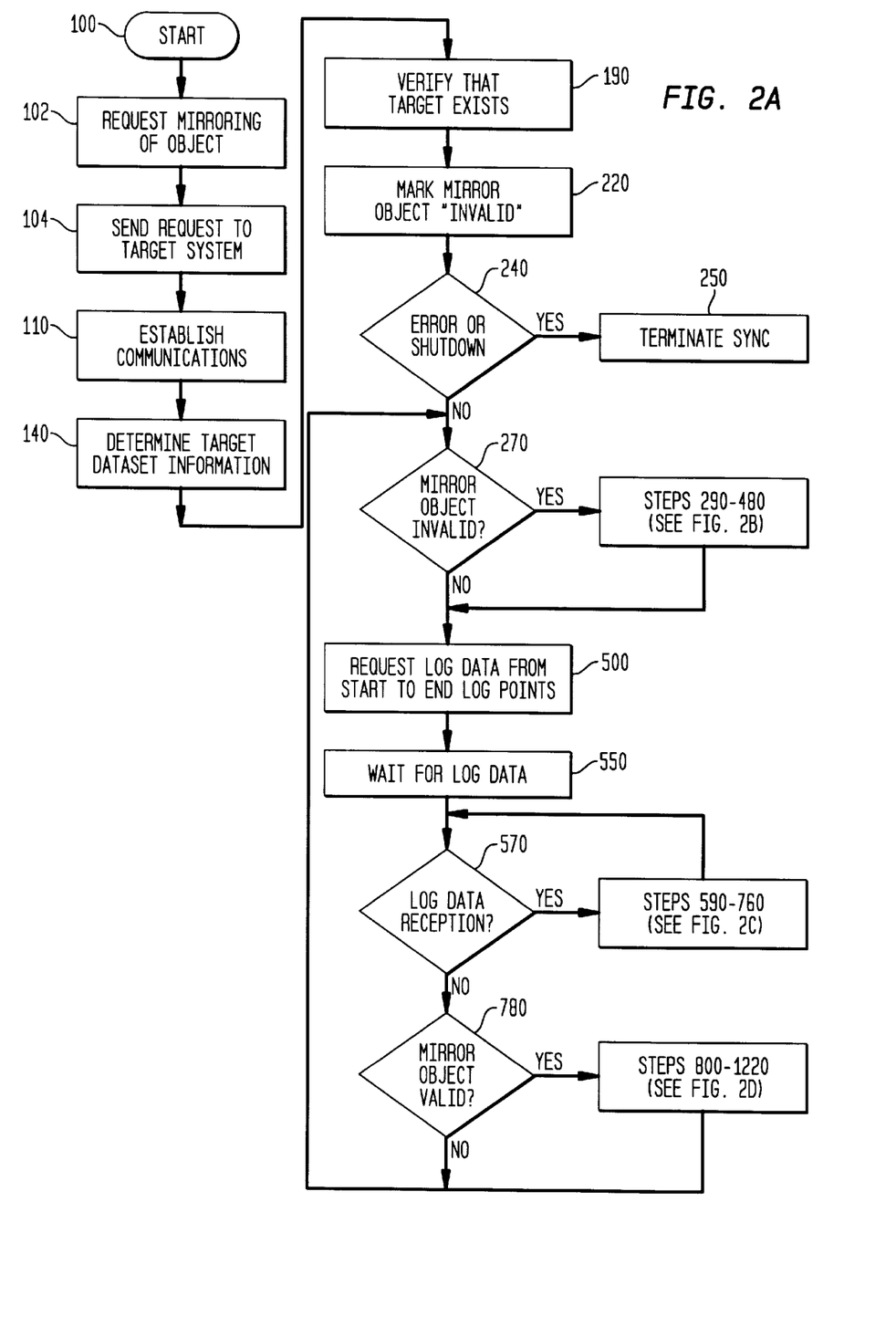
FIGS. 2A, 2B, 2C, 2D and 2E are flow charts of an automatic synchronization process in accordance with the present invention.

As shown in FIG. 2A, in step 100, a data reflector task is started on each of the source and target systems, in the case of remote mirroring (see FIG. 1B). As described above, in the case of local mirroring (see FIG. 1A), because there is only one system involved, only one data reflector task is started, although the essential operational steps will be similar.

Once a data reflector task has started on each system, object mirroring can begin, typically in response to a user request from the source system, as indicated by step 102. This request is sent, in step 104, from the user terminal 25 at the source system to the target system, which, in response, initiates a sub-process beginning with step 110. Mirroring can also be initiated in response to a request from an application running on the source system.

In step 110, the task on the target system opens a link to the resident communications facilities to establish communications between the source and target systems. Once a communications link has been established between the source and target systems, the target system, at step 140, extracts DB2 information from the DB2 catalog to determine certain information regarding the dataset object to be mirrored. The DB2 catalog, which is a part of the DB2 system, provides information on all DB2 objects in the system. In this case, information in the DB2 catalog regarding the source dataset definition is used to determine target dataset information. The DB2 information obtained from the DB2 catalog includes the number of datasets represented by the mirror object and information needed to build the target dataset name. Additionally, size information is also obtained in order to determine the amount of space to be allocated on the target system for the mirror object.

Using the DB2 catalog information extracted and user input identifying the target dataset, it is determined in step 190 whether the target dataset specified by the user exists. Using the user input and appending the catalog information, a target dataset name is thereby generated. A check is then run using the dataset name thus generated to determine whether the dataset exists on the target system. If the target dataset does not exist, operation of the synchronization process terminates. If it is confirmed that the target dataset exists, operation proceeds to step 220 in which a flag indicating the validity of the target dataset is set to "invalid".

Operation then proceeds to step 240 in which it is determined if there is a pending error condition (such as a communications failure) or whether the user has requested a shutdown of the mirroring process. If there is an error condition or a shutdown has been requested, operation of the synchronization process terminates, as indicated in step 250, otherwise, operation proceeds to step 270 in which it is determined whether the target dataset is invalid. If it is determined in step 270 that the target dataset is valid, operation proceeds to step 500, which is described below. Otherwise, if the mirror object is invalid, operation branches to a target dataset update procedure which will now be described with reference to FIG. 2B. (This procedure corresponds to the processes 21 and 22 in FIGS. 1A and 1B.)

Figure 2B:
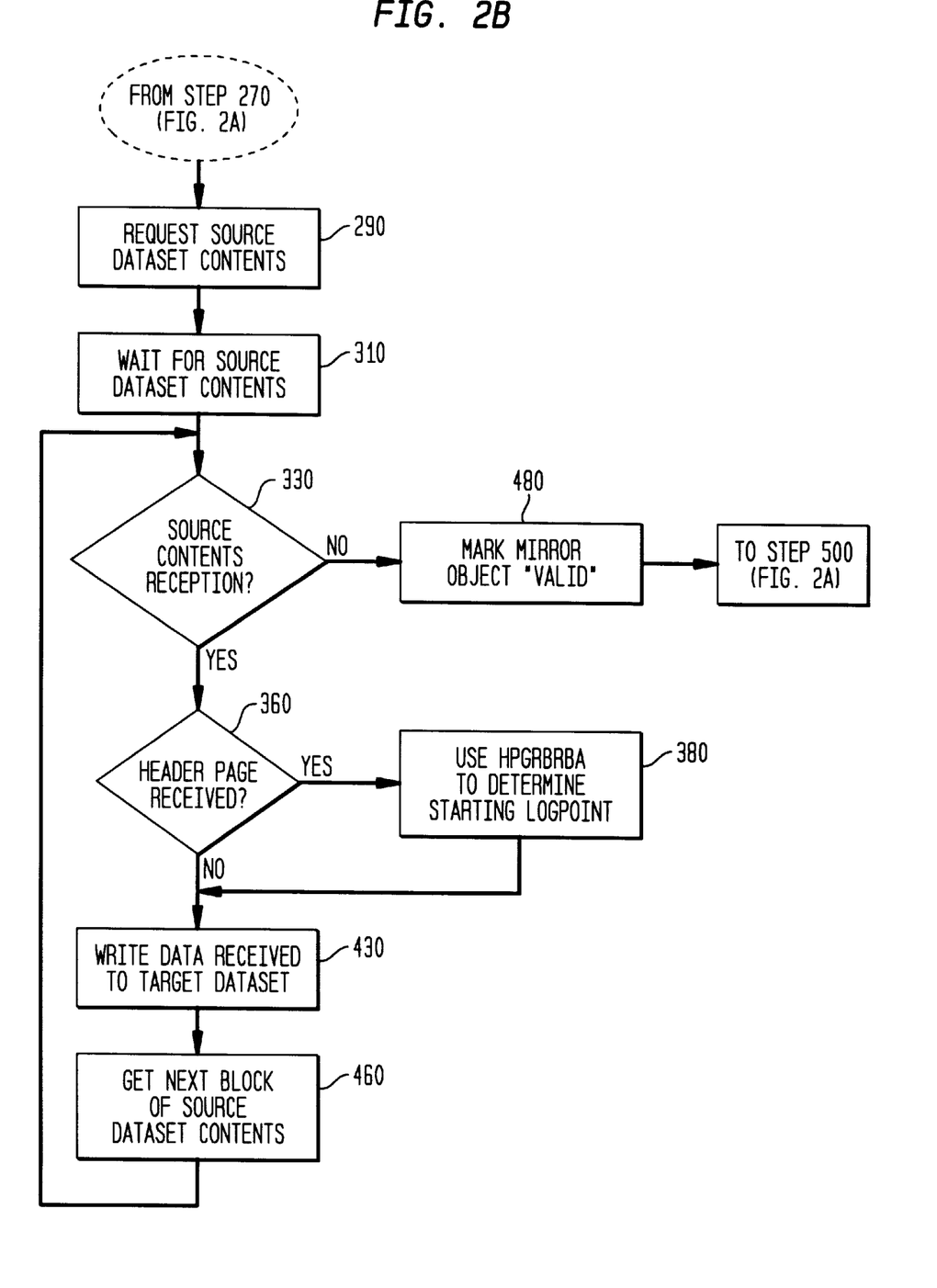

As shown in FIG. 2B, operation proceeds to step 290 in which the target system requests the contents of the source dataset. Once the target system requests the contents of the source dataset in step 290, there may be a delay until the target system actually begins receiving the requested contents. This delay is depicted in step 310. Once reception of the contents of the source dataset begins, operation proceeds to step 330 in which it is determined whether data from the source dataset is being received by the target system. While receiving the source dataset contents (i.e., the answer to the test at step 330 is "yes"), operation proceeds to step 360 in which it is determined whether the data received is a DB2 header page. If a DB2 header page is not being received, operation proceeds to step 430, described below. If the data just received, however, is a DB2 header page, operation branches to step 380 in which the contents of the header page recover base relative byte address (HPGRBRBA) field in the DB2 object header page are extracted in order to determine the starting logpoint from which to apply log file entries to the target dataset, as described below. The HPGRBRBA indicates the last point at which the DB2 DBMS determines the source dataset to be in a consistent state, i.e., where all transaction have been committed and there are no transactions in progress. It is this point which is used by the process of the present invention as the starting logpoint from which to apply log file entries to the target dataset. Once this information has been extracted from the header page, operation then proceeds to step 430.

At step 430, the source dataset contents received by the target system are written to the target dataset. At step 460, another block of the source dataset contents is received by the target system and operation loops back to step 330. If it is determined in step 330 that reception of the source dataset contents has ended (e.g., that the last block received was empty), operation branches to step 480 in which the mirror object is marked "valid." Operation then proceeds to step 500.

In step 500, shown in FIG. 2A, the target system requests from the source system log data from the log file. More specifically, the target system requests those entries in the log file from the starting logpoint, determined in step 380, up to the ending logpoint. The target system thereby obtains any updates to the source dataset that may have been performed while the source dataset contents were being copied to the target dataset in the update process depicted in FIG. 2B. The ending logpoint is the most current log entry, and can be determined, for instance, from an end-of-file indication in the log file. Once the target system requests the log data, there may be a delay until the target system actually begins receiving the requested log data. This delay is depicted in step 550. Once reception of the log data begins, operation proceeds to step 570 in which it is determined whether log data is being received by the target system. While receiving the log data (i.e., the answer to the test at step 570 is "yes"), operation proceeds to a log data processing procedure depicted in FIG. 2C.

Figure 2C:
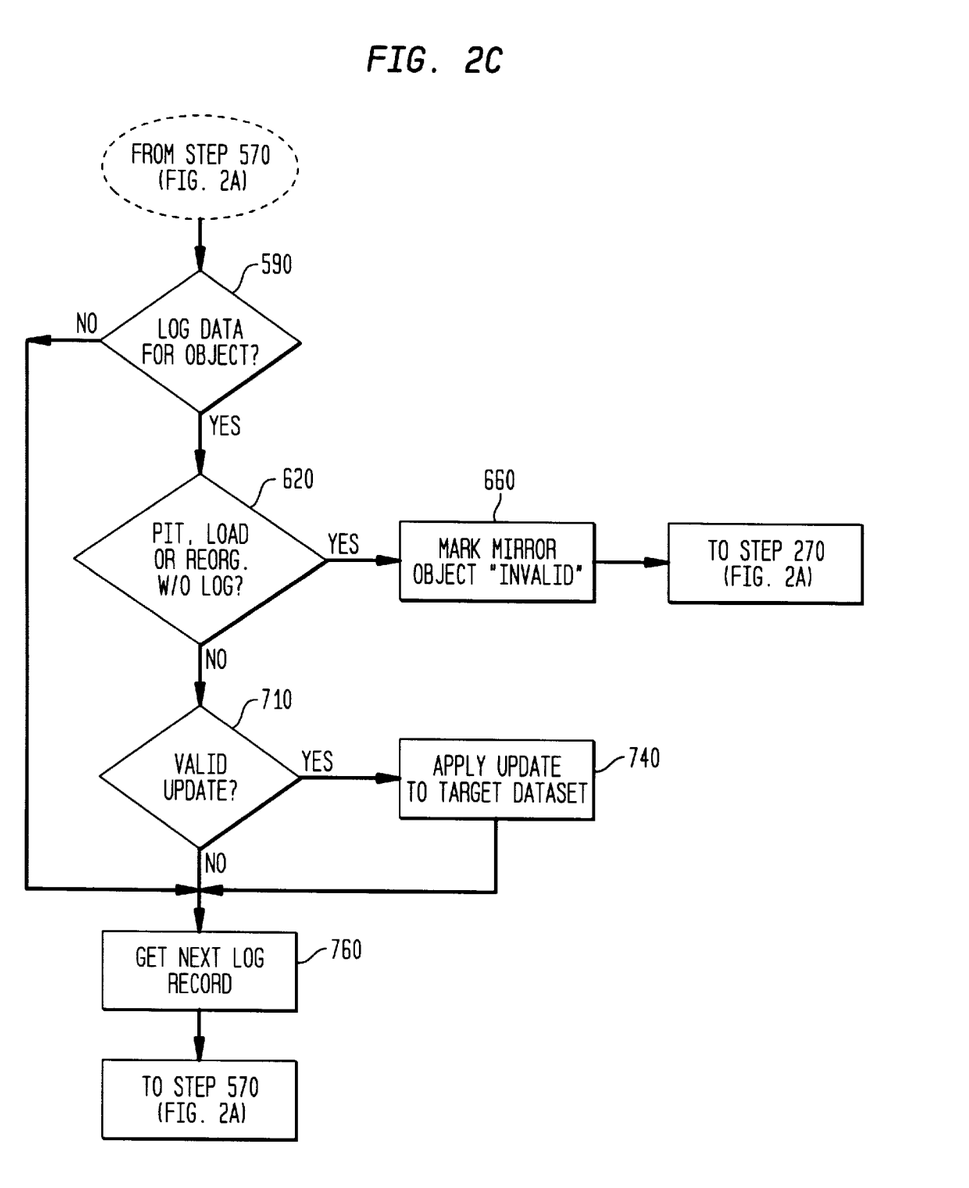

As shown in FIG. 2C, operation proceeds to step 590 in which a determination is made as to whether the log data received pertains to the object selected by the user for mirroring. If not, operation branches to step 760, described below. If the log data received does pertain to the selected mirrored object, operation proceeds to step 620 in which it is determined whether a condition has occurred which would invalidate the mirror object, i.e., whether the received log data indicates that there has been for example, a point-in-time recovery, a LOAD LOG(NO), a REORG LOG(NO) or any such other operation involving the source dataset. If such a condition has occurred, operation proceeds to step 660 in which the mirror object is marked "invalid". Operation then branches to step 780, described below.

If, however, it is determined in step 620 that the log data received does not indicate the occurrence of an invalidating condition, operation proceeds to step 710 in which it is determined whether the log data indicates that there has been a valid update of the source dataset. If there has been a valid update, operation proceeds to step 740 in which the update is applied to the target dataset. If there has not been a valid update, or there has been a valid update which has been applied in step 740 to the target dataset, operation proceeds to step 760 in which the next log record is obtained. After step 760, operation loops back to step 570.

Referring again to FIG. 2A, once all of the log data requested in step 500 has been received and processed in steps 590–760 and there is no more log data in the log file to be received (i.e., the answer to the test in step 570 is "no"), operation proceeds to step 780 in which it is determined whether the mirror object is valid. If it is valid, operation branches to step 800. If not, operation loops back to step 270.

Figure 2D:
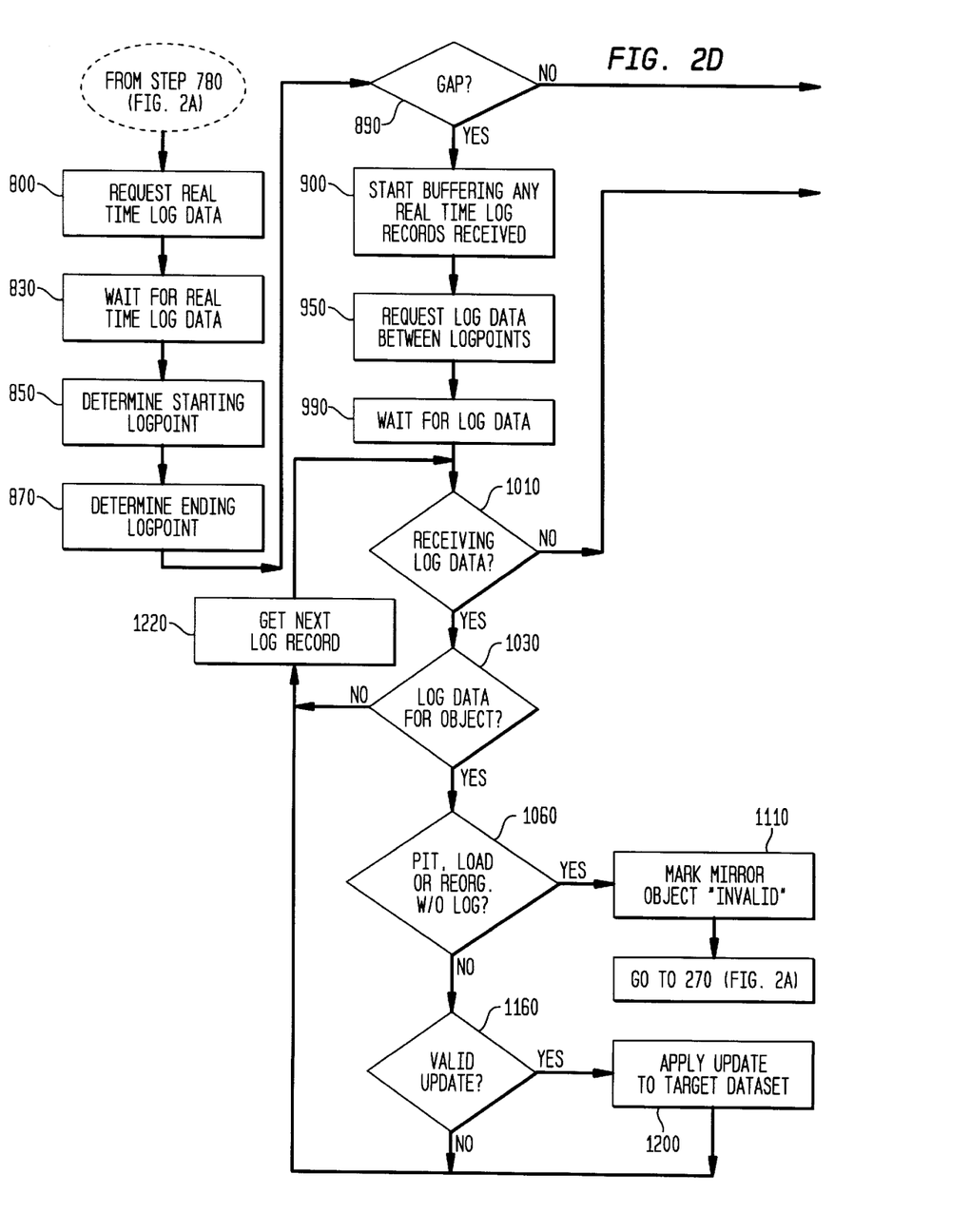
Figure 2E:
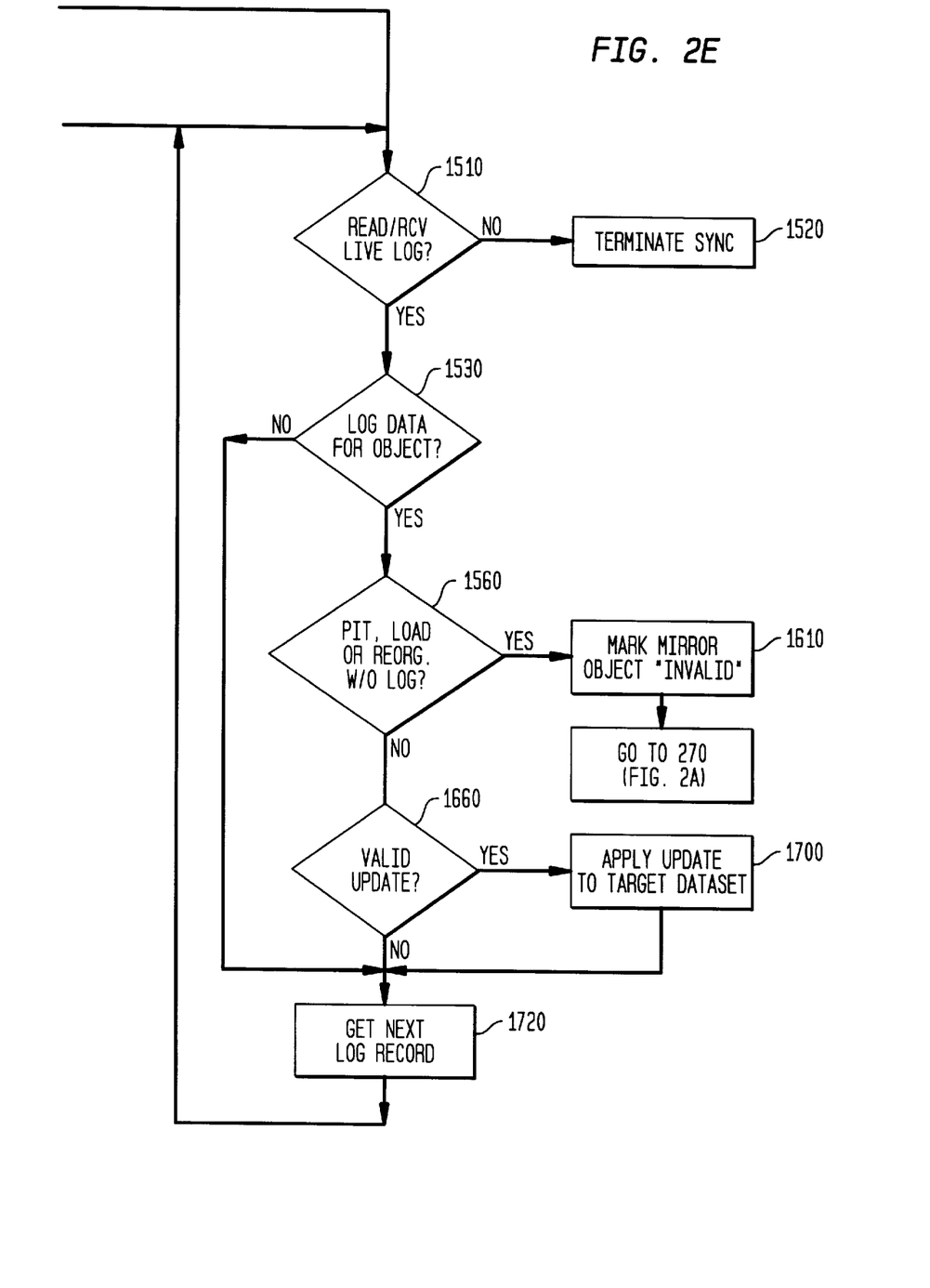

In step 800, shown in FIGS. 2D–2E, the target system requests real time log data from the source system. Real time log data is log data that has not yet been entered into the log file and includes the most recent log data that was generated subsequent to the log data in the log file, which was read in the processing loop described above (steps 570–760). Once the target system requests the real time log data, there will typically be a delay until the target system actually begins receiving the requested log data. This delay is represented by step 830. Once reception of the real time log data begins, operation proceeds to step 850 in which the starting logpoint of the real time log data is determined from the first record of the real time log data received. Operation continues to step 870 in which the ending logpoint of the log data read from the log file in the previous loop (i.e., steps 570–760) is determined.

If there is a gap between the ending and starting logpoints determined above, this indicates that log entries were made into the log file after the target system completed its reading of the log file (in the processing loop comprising steps 570–760) but before the target system received the first record of real time log data in step 850.

Once the aforementioned ending and starting logpoints have been determined, operation proceeds to step 890 in which a determination is made as to whether there is a gap between the ending and starting logpoints. If there is no gap, operation proceeds to step 1510 which commences a procedure for receiving and processing real time log records, described below.

If it is determined in step 890, however, that there is a gap, the log records in the gap must be received from the log file and processed. However, while these gap log records are being received and processed, the target system may also receive further real time log records. As shown in FIGS. 1A and 1B, there are separate communications channels for the real time and file log data so that the target system can receive both types of log records at the same time. As such, in step 900, before the target system proceeds with the processing of gap log records from the log file, buffering of any real time log records received during the processing of the gap log records is initiated in step 900. The first real time record placed in the buffer is the log record received in step 850, described above. As will be described below, once the gap log records have all been received from the log file and processed, the method of the present invention starts processing the buffered real time log records.

Operation proceeds to step 950 in which the target system requests the so-called gap log data in the log file between the ending and starting logpoints so as to obtain any updates to the source dataset that may have been entered into the log file after the target system completed its last reading of the log file (in the loop of steps 570–760) but before the first record of real time log data received in step 850. As before, once the target system requests the log data, there may be a delay until the target system actually begins receiving the requested log data. This delay is represented in step 990. Once reception of the log data begins, operation proceeds to step 1010 in which it is determined whether log data is being received by the target system. While receiving the log data (i.e., the answer to the test at step 1010 is "yes"), operation proceeds to step 1030.

In step 1030, a determination is made as to whether the log data received pertains to the object selected by the user for mirroring. If not, operation branches to step 1220, described below. If the log data received pertains to the selected mirrored object, operation proceeds to step 1060 in which it is determined whether a condition has occurred which would render the mirror object invalid, e.g., whether the received log data indicates that there has been a point-in-time recovery, a LOAD LOG(NO) or a REORG LOG(NO) operation in the source dataset. If such a condition has occurred, operation proceeds to step 1110 in which the mirror object is marked "invalid". Operation then loops back to step 270, described above with reference to FIG. 2A.

If, however, it is determined in step 1060 that the log data received does not indicate the occurrence of an invalidating condition, operation proceeds to step 1160 in which it is determined whether the log data indicates that there has been a valid update of the source dataset. If there has been a valid update, operation proceeds to step 1200 in which the update is applied to the target dataset. If there has not been a valid update, or there has been a valid update which has been applied in step 1200 to the target dataset, operation proceeds to step 1220 in which the next log record is obtained. After step 1220, operation loops back to step 1010.

Once all the gap log data requested in step 950 has been received and processed in steps 1030–1220 and there is no more gap log data to be received (i.e., the answer to the test in step 1010 "no"), operation proceeds to step 1510 in order to process the real time log data.

In step 1510, it is determined whether there is any real time log data currently being received by the target system or whether there are any buffered-up real time log records to be read. If it is determined in step 1510 that there are real time log entries to be processed, operation proceeds to step 1530 in which a determination is made as to whether the real time log data received or read pertains to the object selected by the user for mirroring. If not, operation branches to step 1720, described below. If the log data received pertains to the selected mirrored object, operation proceeds to step 1560 in which it is determined whether a condition has occurred which would render the mirror object invalid, e.g., whether the real time log data indicates that there has been a point-in-time recovery, a LOAD LOG(NO) or a REORG LOG(NO) operation in the source dataset. If such a condition has occurred, operation proceeds to step 1610 in which the mirror object is marked "invalid". Operation then loops back to step 270, described above with reference to FIG. 2A.

If, however, it is determined in step 1560 that the real time log data being processed does not indicate the occurrence of an invalidating condition, operation proceeds to step 1660 in which it is determined whether the log data indicates that there has been a valid update of the source dataset. If there has been a valid update, operation proceeds to step 1700 in which the update is applied to the target dataset. If there has not been a valid update, or there has been a valid update which has been applied in step 1700 to the target dataset, operation proceeds to step 1720 in which the next record of real time log data is obtained, either from the communications channel to the live log process 12 or from the local buffer of real time log data, described above. After step 1720, operation loops back to step 1510.

Once all the real time log data has been received and processed in steps 1510–1720 and there is no more log data to be received or read (i.e., the answer to the test in step 1510 is "no"), the automatic resynchronization of the source and target datasets has been completed (step 1520) and the source and target datasets are in sync.

Once the target and source datasets have been synchronized in accordance with the preceding procedure, the data reflector task 11 running on the target system monitors the link to the source system for further changes in state. This monitoring procedure is depicted in the flow chart of FIG. 3. As will be described, if a change in state which would invalidate the mirror image of the object being mirrored is noted, operation branches off to the resynchronization process described above.

Figure 3:
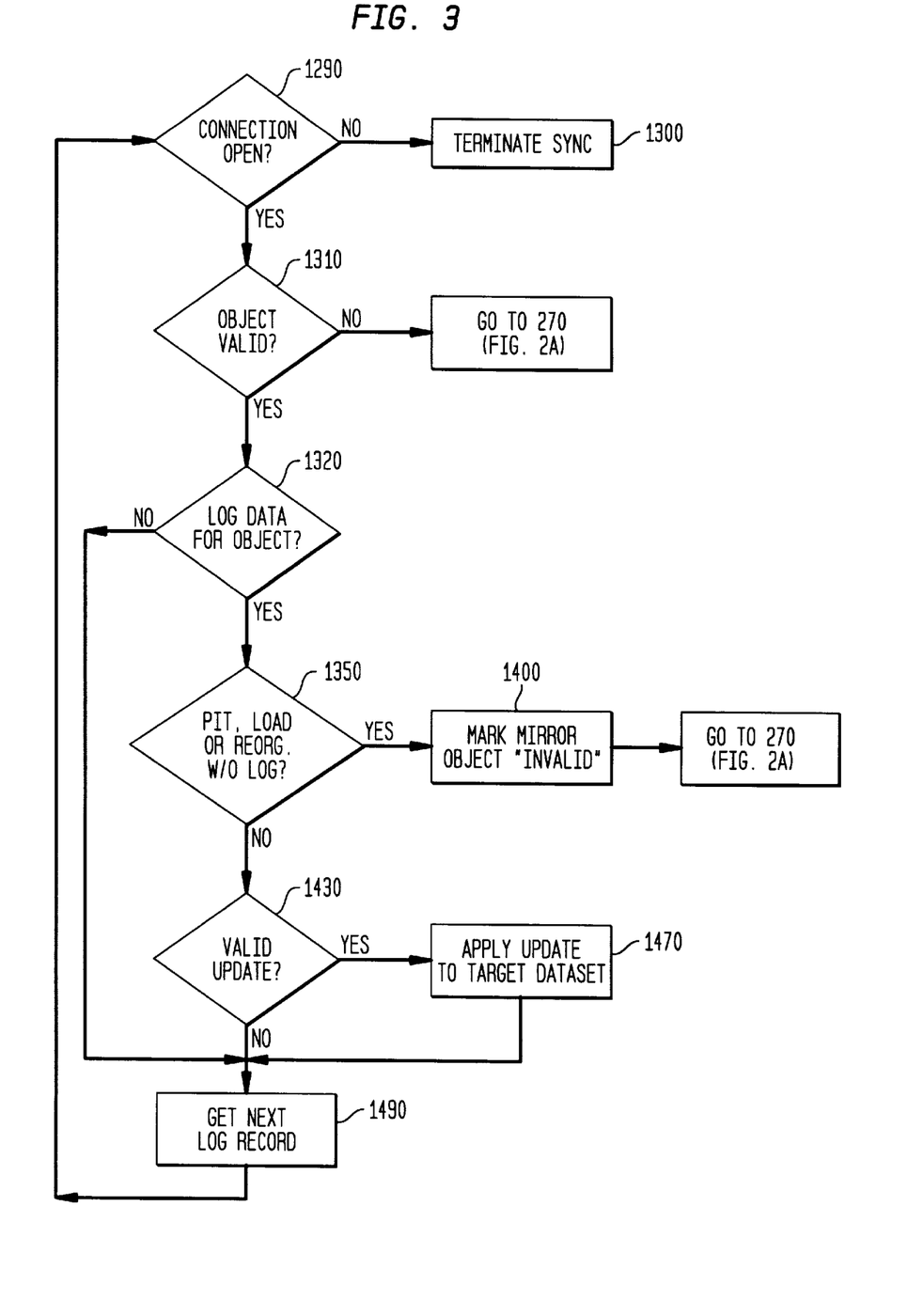
FIG. 3 is a flow chart of a change monitoring process in accordance with the present invention.

At step 1290, it is determined whether the connection between the source and target systems is still open. If not, the synchronization process is terminated (step 1300). If the communications link is open, operation proceeds to step 1310 in which it is determined whether the mirror object is still valid. If the mirror object is not valid, operation loops back to step 270, described above, but if it is valid, operation proceeds to step 1320.

In step 1320, a determination is made as to whether the most recent log data received pertains to the object selected by the user for mirroring. If not, operation branches to step 1490, in which the next log record sent by the source to the target system is obtained. If the log data received pertains to the selected mirrored object, operation proceeds to step 1350 in which it is determined whether a condition has occurred which would invalidate the mirror object, e.g., whether the received log data indicates that there has been a point-in-time recovery, a LOAD LOG(NO) or a reorganization LOG(NO) operation in the source dataset. If such a condition has occurred, operation proceeds to step 1400 in which the mirror object is marked "invalid". Operation then loops back to step 270 (see FIG. 2A) and the resynchronization procedure described above is carried out.

If, however, it is determined in step 1350 that the log data received does not indicate the occurrence of an invalidating condition, operation proceeds to step 1430 in which it is determined whether the log data indicates that there has been a valid update of the source dataset. If there has been a valid update, operation proceeds to step 1470 in which the update is applied to the target dataset. If there has not been a valid update, or there has been a valid update which has been applied in step 1470 to the target dataset, operation proceeds to step 1490 in which the next log record is obtained. After step 1490, operation loops back to step 1290.

The procedure of FIG. 3 is performed as long as the mirror object is valid and the communications link between the source and target systems is open and operating properly. As such, the mirror object stays synchronized with the source dataset.

What is claimed is:

1. A method of synchronizing databases, wherein actions applied to a first database are logged, the method comprising the steps of:
reading data contained in the first database;
loading a second database with the data read from the first database;
determining a set of logged actions to be applied to the second database from a data log received from the first database;
applying the set of logged actions to the second database;
receiving a real time data log from the first database;
before applying the real time data log, determining whether additional logged actions were logged in the data log subsequent to applying the set of logged action, and if additional logged actions were logged, receiving the data log having the additional logged actions while buffering the real time data log and continuing to receive the real time data log, and applying the additional logged actions to the second database;
applying a set of real time logged actions in the real time data log to the second database.

2. The method of claim 1, wherein the step of determining a set of logged actions includes:
determining a starting log point from the data contained in the first database; and
determining an ending log point as a function of the last action to be logged, and
wherein the set of logged actions includes logged actions from the starting log point to the ending log point.

3. The method of claim 2, wherein the starting log point is the last point at which the first database was in a consistent state.

4. The method of claim 3, wherein the starting log point is determined from data in a header page contained in the first database.

5. The method of synchronizing databases according to claim 1, the method further including:
receiving log data indicative of the logged actions;
determining whether the second database is invalid and is so, performing the steps of:
the reading data, the loading the second database, the determining a set of logged actions, the applying the set of logged actions, the determining whether additional logged actions were logged, and the applying a set of real time logged actions.

6. The method of claim 5, wherein the step of determining if the second database is invalid includes receiving the log data and determining from the log data whether one or more actions have been applied to the first database but not logged.

7. The method of claim 6, wherein the second database is invalid if the log data received indicates that at least one of a point in time recovery operation, a reorganization without log operation and a load without log operation has been performed on the first database.

8. The method of claim 7, further including:
applying the buffered set of real time logged actions to the second database, after the applying a set of logged actions in the second data log to the second database.

9. The method of claim 1, further including:
detecting an occurrence of a predetermined condition that causes a first database to be out of sync with a second database.

10. The method of claim 9, wherein the detecting includes receiving the log data and determining from the log data whether one or more actions have been applied to the first database but not logged.

11. The method of claim 9, wherein the detecting includes:
monitoring the real time data log for an occurrence of a predetermined condition.

12. The method of claim 11, wherein the predetermined condition includes any one of point-in-time recovery, reorganization without log operation, and load without log operation.

13. The method of claim 1, wherein the determining whether additional logged actions were logged in the data log subsequent to applying the set of logged action includes determining whether a gap exists between an end point of the data log and a starting point of the real time log record.

14. A method of automatically synchronizing mirrored databases, comprising:
loading a second database with data read from a first database;
determining a set of logged actions to be applied to the second database from a data log received from the first database;
determining from the set of logged actions whether the second database is invalid, and if the second database is determined to be invalid, automatically returning to the step of loading the data contained in the first database;
applying the set of logged actions to the second database;
receiving a real time log record from the first database;
determining from the real time log record whether the second database is invalid, and if the second database is determined to be invalid, automatically returning to the step of reading the data contained in the first database;
applying the real time log record to the second database.

15. The method of 14, further including:
before applying the real time log record, determining whether additional logged actions were logged in the data log subsequent to applying the set of logged action, and if additional logged actions were logged, receiving the data log having the additional logged actions while buffering the real time log record and continuing to receive the real time log record, and applying the additional logged actions to the second database.

16. The method of claim 14, wherein the real time log record is stored in a volatile memory.

17. A method of automatically synchronizing a target database with a source database, comprising:
monitoring log data to automatically determine if a target database having a mirror copy of a source database is invalid;
if the target database is determined to be invalid,
loading the target database with data contained in the source database;
automatically determining if one or more updates to the source database which have not yet been loaded in the target database are logged in the log data;
if the one or more updates are logged, automatically determining from the log data whether the target database is invalid,
if the target database is invalid, returning to the step of loading the target database;

automatically applying the log data to the target database, the applied log data starting from a starting logpoint to an end of file indicator of the log data;

automatically determining from a real time log data whether one or more additional updates are contained in the log data, and if one or more additional updates are contained in the log data, determining if the one or more additional updates indicate that the target database is invalid, and if the target database is determined to be invalid, returning to the step of loading the target database;

applying the one or more additional updates in the log data to the target database and simultaneously buffering the real time log data and receiving additional real time log data while applying the additional updates;

automatically determining from the buffered real time log data whether the target database is invalid, and if the target database is determined to be invalid, returning to the step of loading the target database;

applying the buffered real time log data to the target database;

automatically determining from the received additional real time log data whether the target database is invalid, and if the target database is determined to be invalid, returning to the step of loading the target database; and applying the received additional real time log data.

18. The method of claim 17 wherein the determining whether the target database is invalid includes:

determining whether any one of point-in-time recovery, reorganization without log operation, and load without log operation was performed on a source database.

19. The method of claim 17, wherein the automatically determining from a real time log data whether additional updates are contained in the log data includes:

determining whether there exists a time gap between the end of indicator and a starting logpoint of the real time log data.

20. The method of claim 17 wherein the method further includes:

receiving the log data via a first communication channel; and receiving the real time log data via a second communication channel, wherein the log data is received and applied to the target database while the real time log data is received and buffered.

21. The method of claim 17, further including:

automatically returning to the monitoring when the source database and the target database are synchronized.

* * * * *